Aug. 14, 1923.
G. DOMOWICZ
1,464,647
GAS EXTRACTOR
Filed Feb. 27, 1920
2 Sheets—Sheet 2
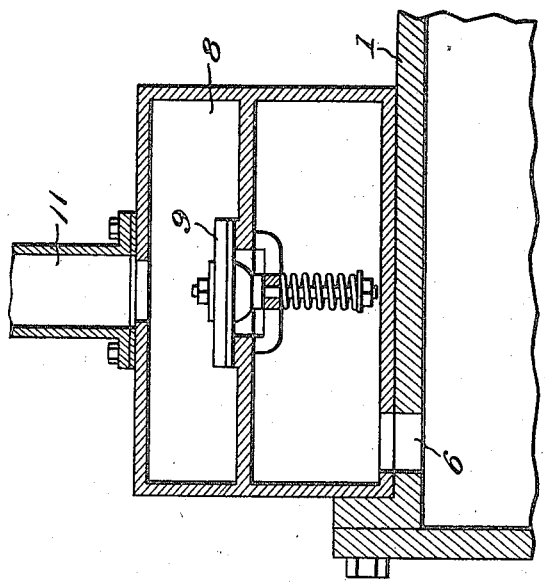
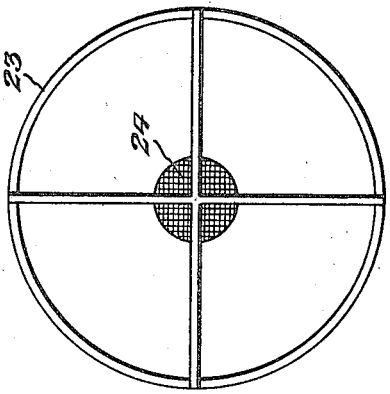
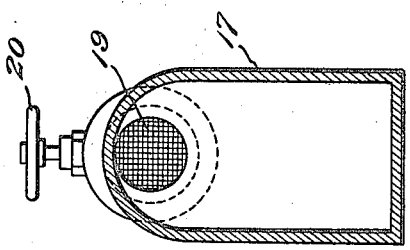
George Domowicz INVENTOR
BY Victor J. Evans ATTORNEY
WITNESS:
Edwin F. McKee
L. B. Middleton Patented Aug. 14, 1923.

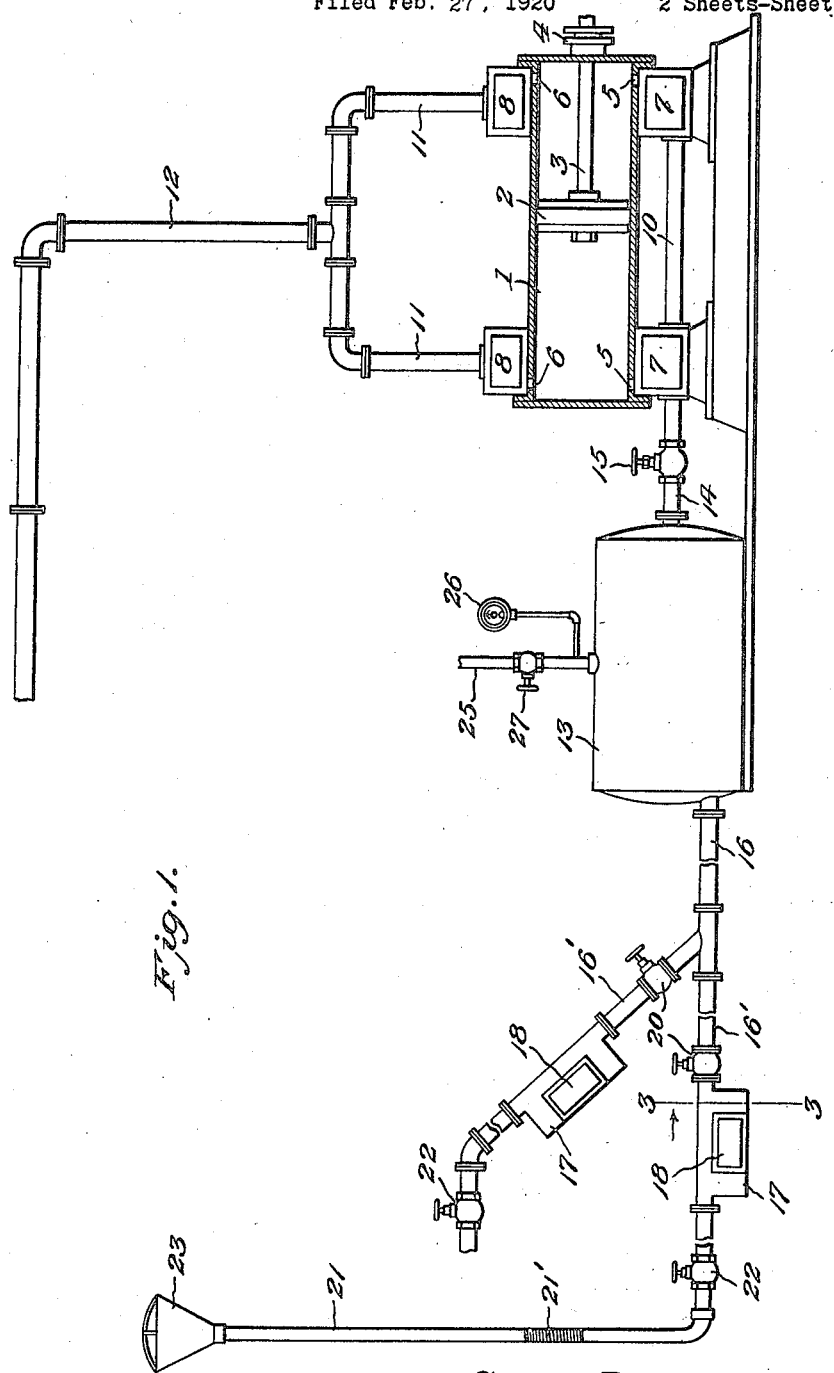

1,464,647

UNITED STATES PATENT OFFICE.

GEORGE DOMOWICZ, OF WILKES-BARRE, PENNSYLVANIA.

GAS EXTRACTOR.

Application filed February 27, 1920. Serial No. 361,801.

*To all whom it may concern:*

Be it known that I, GEORGE DOMOWICZ, a citizen of the United States, residing at Wilkes-Barre, in the county of Luzerne and State of Pennsylvania, have invented new and useful Improvements in Gas Extractors, of which the following is a specification.

This invention relates to means for exhausting gas from mines and the principal object of the invention is to provide pipes leading to the different parts of the mine and including flexible terminals which can be readily handled by the miners, and suction means connected with the pipes for drawing the gas through said pipes and exhausting it out of the mine.

Another object of the invention is to provide means whereby any of the branch pipes may be disconnected from the outer pipes without breaking the suction in said other pipes.

Still another object of the invention is to provide a suction chamber in the system so that a vacuum may be maintained therein without a continuous operation of the suction means.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a diagrammatic view of my system.

Figure 2 is an enlarged view of one of the valve chests.

Figure 3 is a section on line 3—3 of Figure 1.

Figure 4 is a sectional detail of one of the nozzles.

In these views 1 indicates a cylinder which constitutes a part of the suction device. A piston 2 is located in said cylinder and the piston rod 3 passes through a stuffing box 4 at one end of the cylinder and is connected with suitable means for reciprocating it. An inlet port 5 and an outlet port 6 are arranged at each end of the cylinder and a pair of inlet valve chests 7 are arranged on one side of the cylinder and a pair of exhaust valve chests 8 are arranged on the other side. Each of these chests is provided with a spring controlled valve 9. The inlet valve chests are connected together by the piping 10 and the exhaust chests are connected together by the piping 11, this piping being connected with the exhaust main 12 which leads the gas to a point outside of the mine. One of the inlet chests is connected with the vacuum chamber 13 by the piping 14 in which is located a valve 15. The other end of the vacuum chamber 13 is connected with the piping 16 which leads to the various chambers of the mine. Each branch 16' of this piping is provided with a trap box 17 which is provided with an airtight door 18 so that the trap may be cleaned out whenever desired. A screen 19 is placed across the outlet opening of each box. A valve 20 is placed in each branch between its junction with the main line and the box so that said branch may be cut off from the main line when the box is to be opened. The terminal of each branch is formed of flexible tubing 21 which is provided with an interior coil 21' to prevent the tubing from collapsing. A valve 22 is arranged in each branch adjacent the connection of the tubing therewith. A wide mouthed nozzle 23 is connected with the end of each tubing and a screen 24 is placed over the small end of this nozzle to prevent particles of coal and the like from entering the tubing.

If desired I may connect a stand pipe 25 with the vacuum chamber 13 and connect a gage 26 therewith. This pipe 25 is provided with a valve 27. This pipe may be led to any desired point where the gas may be stored and used for different purposes.

It will thus be seen that when the piston is being reciprocated, suction will be created in the pipe line and in the vacuum chamber so that any gas in the mine will be drawn through the pipe line into the cylinder and will be discharged from the cylinder into the exhaust line and thus the mine freed from gas. The miners can easily handle the tubing connecting the nozzles so that pockets and holes may have the gas drawn therefrom. By closing the valves at the ends of the branches a vacuum may be created in the vacuum chamber 13 and then the suction device stopped as the vacuum in the said chamber will be sufficient to suck the gas through the pipe lines for ordinary purposes. Of course as soon as the vacuum chamber is filled with gas the suction device must be set into operation again. When it is desired to clean out the boxes the valves 20 are closed so that the boxes may easily be cleaned without interfering with the other branches.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a ventilating system for mines, a main exhaust line, a suction creating device connected therewith, a plurality of branch exhaust lines connected with the main line, flexible portions forming the terminals of said branch lines, nozzles carried by said terminals, a trap casing located in each branch line, an air tight door for each casing whereby the casings may be cleaned, a vacuum tank in the main line intermediate said suction creating device and said branch lines, and a stand pipe connected with the vacuum tank and having a valve therein.

In testimony whereof I affix my signature.

GEORGE DOMOWICZ.